(12) United States Patent
Ariyur et al.

(10) Patent No.: US 7,457,619 B2
(45) Date of Patent: Nov. 25, 2008

(54) METHOD FOR OPTIMIZING WIRELESS DATA LINK CAPACITY BETWEEN MOBILE VEHICLES

(75) Inventors: Kartik B. Ariyur, Minnetonka, MN (US); Sabera Sultana Kazi, Silver Spring, MD (US); Chandrika Bommalingaiahnapallya, Hillsboro, OR (US)

(73) Assignee: Honeywell International Inc., Morristown, NJ (US)

( * ) Notice: Subject to any disclaimer, the term of this patent is extended or adjusted under 35 U.S.C. 154(b) by 155 days.

(21) Appl. No.: 11/059,024

(22) Filed: Feb. 14, 2005

(65) Prior Publication Data

US 2006/0211413 A1 Sep. 21, 2006

(51) Int. Cl.
*H04Q 7/20* (2006.01)
*H04B 7/185* (2006.01)

(52) U.S. Cl. .................... 455/423; 370/316
(58) Field of Classification Search ................ 375/343; 455/13.1, 41.2, 431, 423–425, 67.11, 446; 370/329, 331–334; 340/988
See application file for complete search history.

(56) References Cited

U.S. PATENT DOCUMENTS

| | | | | |
|---|---|---|---|---|
| 6,018,659 | A * | 1/2000 | Ayyagari et al. | 455/431 |
| 6,243,568 | B1 * | 6/2001 | Detlef et al. | 455/226.4 |
| 6,839,560 | B1 * | 1/2005 | Bahl et al. | 455/456.1 |
| 2002/0042269 | A1 * | 4/2002 | Cotanis | 455/423 |
| 2003/0053424 | A1 * | 3/2003 | Krishnamurthy et al. | 370/316 |
| 2004/0165575 | A1 * | 8/2004 | Yang et al. | 370/349 |
| 2005/0123072 | A1 * | 6/2005 | Guimaraes | 375/319 |
| 2005/0221829 | A1 * | 10/2005 | Nishida et al. | 455/440 |

FOREIGN PATENT DOCUMENTS

| | | | |
|---|---|---|---|
| EP | 0963061 | | 8/1999 |
| FR | 0554 197 A1 | * | 1/1993 |
| JP | 2000082976 A | * | 3/2000 |
| JP | 2004246627 A | * | 2/2004 |

OTHER PUBLICATIONS

Binetti et al., "Control of Formation Flight Via Extremum Seeking", "Proceedings for the 2002 American Control Conference ACC, Anchorage, AK May 8-10, 2002", pp. 2848-2853, Publisher: IEEE, Published in: New York, NY.

* cited by examiner

*Primary Examiner*—George Eng
*Assistant Examiner*—Michael Faragalla
(74) *Attorney, Agent, or Firm*—Fogg & Powers LLC; Gregory M. Taylor

(57) ABSTRACT

Wireless data links between mobile vehicles are optimized by positioning the mobile vehicles in default locations, creating a wireless data link between the vehicles, and measuring the initial capacity of the wireless data link. An extremum-seeking algorithm is then performed, in which the mobile vehicles are moved locally around their default locations, and the resulting changes in capacity of the wireless data link are measured. The algorithm mathematically determines, based on the measured changes in capacity of the wireless data link, optimum locations at which, when the mobile vehicles are positioned there, the capacity of the wireless data link reaches a local maximum value. The mobile vehicles are then moved to the optimum locations.

41 Claims, 3 Drawing Sheets

METHOD FOR OPTIMIZING WIRELESS DATA LINK CAPACITY BETWEEN MOBILE VEHICLES

TECHNICAL FIELD

This application relates in general to telecommunications and, more specifically, to systems and methods for improving wireless data link capacity between mobile vehicles.

BACKGROUND

Mobile vehicles, such as, for example, unmanned aerial vehicles (UAVs), are becoming more commonly used in a wide variety of applications. These vehicles are typically equipped with one or more sensors to monitor and collect data regarding the vehicle's surrounding environment. This data is often transmitted through other relay vehicles over wireless data links to a human operator or a central data gathering station.

In some applications, mobile vehicles can perform their desired functions by operating at high altitudes or in other free-space environments in which wireless communications between the vehicles are virtually unobstructed. In other applications, however, it may be desirable to use mobile vehicles in environments having complex terrain, such as, for example, urban environments with tall buildings or natural environments with hills, valleys, trees, or other obstructions. In such complex environments, the wireless communications between mobile vehicles are subject to very complicated electromagnetic interference effects. Even a slight displacement of a vehicle's position may result in significant changes in the transmitted/received bit rates of the vehicle.

Nevertheless, in conventional applications, mobile vehicles are typically placed in default locations determined in advance, and very little, if any, attempt is made to improve the signal strength of wireless communications between the mobile vehicles. Thus, a need exists for a method to improve the capacity of wireless communications between mobile vehicles operating in complex environments.

SUMMARY OF THE INVENTION

The above-mentioned drawbacks associated with existing mobile vehicle systems are addressed by embodiments of the present invention and will be understood by reading and studying the following specification.

In one embodiment, a method for optimizing a wireless data link between a first mobile vehicle and a second mobile vehicle comprises positioning the first mobile vehicle in a first location and the second mobile vehicle in a second location and creating a wireless data link between the first mobile vehicle and the second mobile vehicle. The method further comprises measuring the initial capacity of the wireless data link, moving the first mobile vehicle around the first location and the second mobile vehicle around the second location, and measuring the resulting changes in capacity of the wireless data link. The method further comprises mathematically determining, based on the measured changes in capacity of the wireless data link, a third location and a fourth location at which, when the first mobile vehicle and the second mobile vehicle are positioned there, respectively, the capacity of the wireless data link reaches a local maximum value, and moving the first mobile vehicle to the third location and the second mobile vehicle to the fourth location.

In another embodiment, a method for optimizing a wireless data link involving a first mobile vehicle comprises positioning the first mobile vehicle in a first location, creating a wireless data link between the first mobile vehicle and a telecommunications device, and measuring the initial capacity of the wireless data link. The method further comprises moving the first mobile vehicle around the first location and measuring the resulting changes in capacity of the wireless data link. The method further comprises mathematically determining, based on the measured changes in capacity of the wireless data link, a second location at which, when the first mobile vehicle is positioned there, the capacity of the wireless data link reaches a local maximum value, and moving the first mobile vehicle to the second location.

In another embodiment, a process for optimizing a wireless data link between a first mobile vehicle and a second mobile vehicle comprises: (a) placing the first and second mobile vehicles in default positions; (b) creating a wireless data link between the first and second mobile vehicles; and (c) measuring the initial capacity of the wireless data link and storing it as a maximum measured capacity. The process further comprises: (d) performing an extremum-seeking algorithm on the capacity of the wireless data link; (e) moving the first and second mobile vehicles to the positions determined by the extremum-seeking algorithm and measuring the new data link capacity; and (f) determining whether the new data link capacity exceeds a minimum threshold value and, if not, skipping to step (i). The process further comprises: (g) determining whether the new data link capacity exceeds the previously-stored maximum measured capacity and, if so, replacing the maximum measured capacity with the new data link capacity value and storing the corresponding positions of the mobile vehicles; (h) repeating steps (d)-(g) until the data link capacity stabilizes; and (i) moving the first and second mobile vehicles to the positions corresponding to the maximum measured capacity.

In another embodiment a mobile vehicle comprises a processor comprising an optimization module, a sensor coupled to the processor, and a transceiver coupled to the processor. The transceiver is capable of sending and receiving wireless data transmissions, and the optimization module is configured to mathematically determine an optimum local position of the mobile vehicle such that the capacity of a wireless data link between the transceiver and another telecommunications device reaches a local maximum value.

The details of one or more embodiments of the claimed invention are set forth in the accompanying drawings and the description below. Other features and advantages will become apparent from the description, the drawings, and the claims.

BRIEF DESCRIPTION OF THE DRAWINGS

Like reference numbers and designations in the various drawings indicate like elements.

DETAILED DESCRIPTION OF THE PREFERRED EMBODIMENT

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the spirit and scope of the present invention. The following detailed description is, therefore, not to be taken in a limiting sense.

Figure 1:
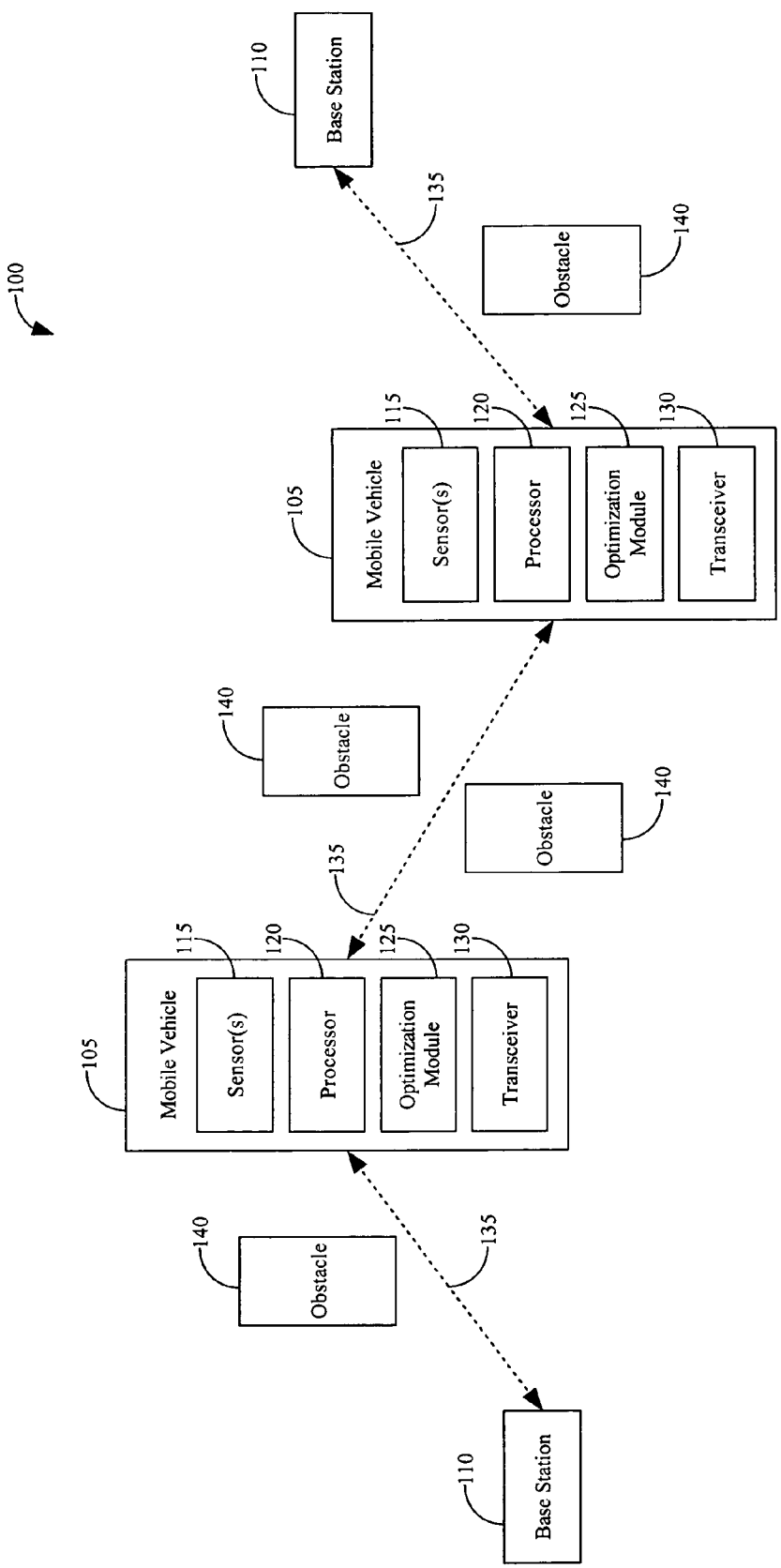
FIG. 1 is a block diagram of one embodiment of a system having a plurality of mobile vehicles in communication with one another.

FIG. 1 is a block diagram of one embodiment of a system 100 having a plurality of mobile vehicles 105 in communication with one another. The mobile vehicles 105 may comprise a wide variety of vehicles, such as, for example, hover-capable UAVs (e.g. organic air vehicles), fixed-wing UAVs, mobile ground vehicles, unmanned underwater vehicles (UUVs), or the like. In addition, the configuration of the mobile vehicles 105 may vary widely, depending on the application and the desired functions to be performed by the mobile vehicles 105. For example, in some applications, certain mobile vehicles 105 act primarily as communication relays, whereas other mobile vehicles 105 actively monitor and collect data regarding their surrounding environment. The wireless communication system may use electromagnetic radiation or acoustic waves (especially for undersea communications) as the means of communication.

In the illustrated embodiment, the mobile vehicles 105 provide a communication link between two base stations 110. The base stations 110 may comprise many possible communication devices, ranging from portable handheld devices to fixed data gathering stations. For example, in some specific exemplary embodiments, the system 100 is used by military or law enforcement personnel to facilitate communications between a central command center and one or more military or law enforcement officers operating remotely in the field. In these embodiments, the first base station 110 may comprise one or more fixed communication devices operated at the command center, and the second base station 110 may comprise one or more portable communication devices used by the military or law enforcement officers operating remotely in the field.

In the embodiment illustrated in FIG. 1, each mobile vehicle 105 comprises one or more sensors 115, a processor 120, an optimization module 125, and a transceiver 130. The sensors 115 may comprise a wide variety of devices, such as, for example, audio sensors, temperature sensors, acoustic sensors, or electromagnetic imaging sensors (e.g., optical sensors, through-wall imagers, foliage-penetration radar, etc.), to name a few. The system 100 may also comprise one or more fixed sensors (not shown), such as seismic sensors, for which the mobile vehicles 105 act primarily as communication relays.

In operation, the behavior of each mobile vehicle 105 is controlled by its corresponding processor 120. Data collected by the sensors 115 is transmitted to or from a given mobile vehicle 105 through its corresponding transceiver 130. These transmissions typically occur over wireless data links 135 between the mobile vehicles 105 and/or the base stations 110. If the system 100 is operating in a free-space environment, these wireless data links 135 are virtually unobstructed, and the mobile vehicles 105 can be arranged in whatever configuration results in the maximum signal strength, or capacity, of each wireless data link 135 (e.g., equidistant distribution in a straight line between base stations 110).

As illustrated in FIG. 1, however, the mobile vehicles 105 may operate in an environment having obstacles 140, such as, for example, buildings, cars, hills, valleys, trees, or other irregularities in terrain. These obstacles 140 can create very complicated electromagnetic interference effects in the wireless communications between the mobile vehicles 105 and/or the base stations 110. For undersea acoustic communications, complex interference multipath propagation and interference results even without obstacles due to reflections off thermal gradient layers, and water surface reflections. In such environments, even a slight displacement in the position of a given mobile vehicle 105 may result in significant changes in the transmitted/received bit rates of the mobile vehicle 105. Accordingly, as described in more detail below, the optimization module 125 of each mobile vehicle 105 is configured to determine an optimum local position for each mobile vehicle 105 such that the capacities of the wireless data links 135 are locally maximized to the extent possible, given the design constraints of the specific application.

Figure 2:
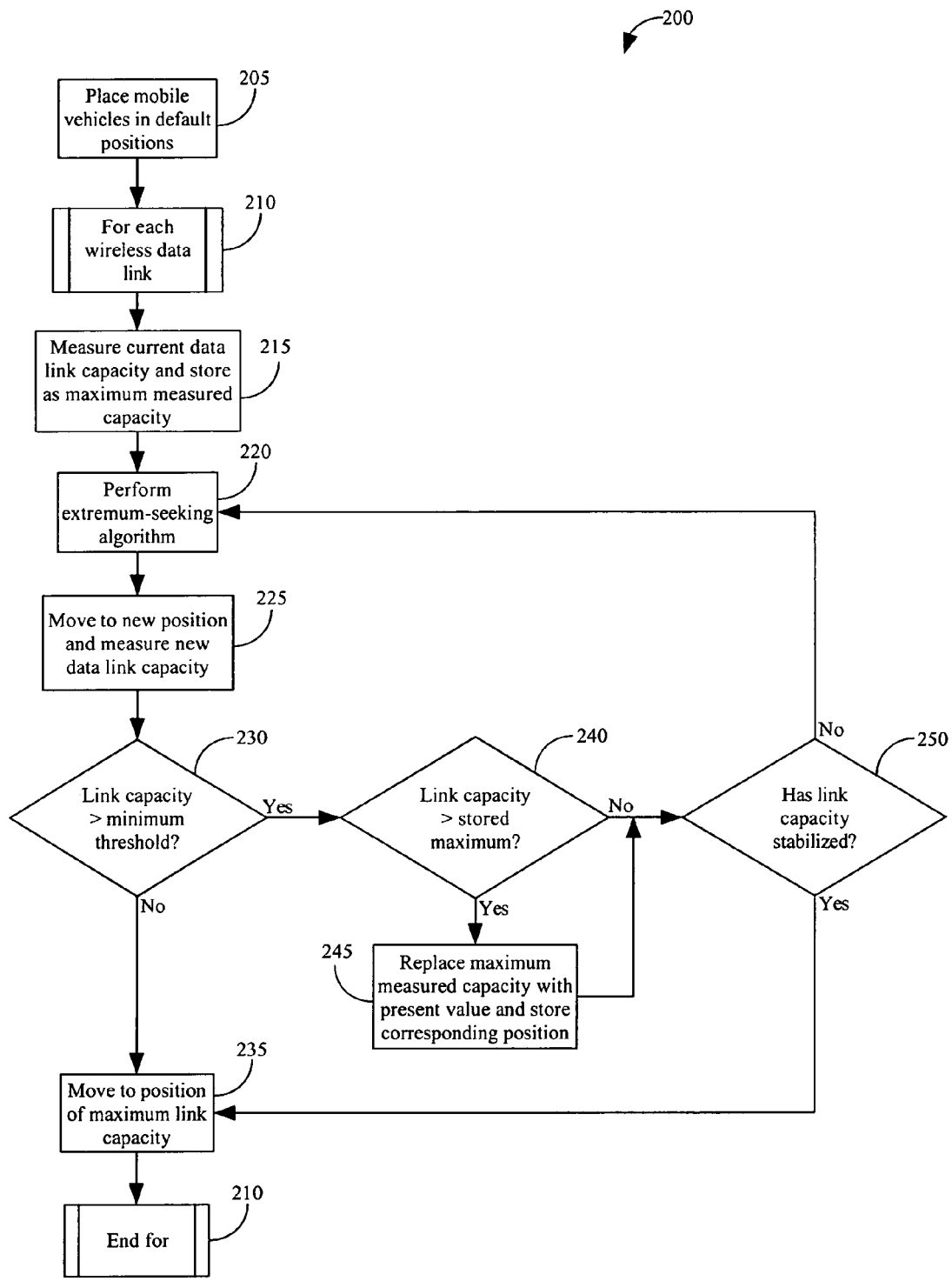
FIG. 2 is a flow chart illustrating one embodiment of a process for positioning mobile vehicles.

FIG. 2 is a flow chart illustrating one embodiment of a process 200 for positioning mobile vehicles 105. In a first step 205, the mobile vehicles 105 are placed in default positions determined in advance. These positions are typically selected based on the given environment and the desired functions to be performed by the mobile vehicles 105. For example, in the embodiment illustrated in FIG. 1, a default position for each mobile vehicle 105 is selected such that the mobile vehicles 105 can provide a stable communication link between the base stations 110. Thus, if the mobile vehicles 105 are operating in an urban environment for example, they might be positioned on the tops of selected buildings, determined in advance, as a default placement.

In some embodiments, it may be desired to use the sensor (s) 115 of a given mobile vehicle 105 to monitor activity at a particular location. For example, a mobile vehicle 105 may be used to conduct video surveillance of activity on a particular street in a complex urban environment. In this example, the default position of the mobile vehicle 105 would be selected such that the optical sensor(s) of the mobile vehicle 105 have an unobstructed view of the appropriate street. This position might be on the edge of a particular rooftop or on a specific balcony or ledge.

Once the mobile vehicles 105 have been placed in their default positions, a series of steps 210 are repeated for each wireless data link 135. In a step 215, the current capacity of the wireless data link 135 is measured and stored as the maximum measured link capacity. In a next step 220, an extremum-seeking algorithm is performed by the optimization modules 125 of the appropriate mobile vehicles 105, as described in more detail below in connection with FIG. 3.

In relatively simple environments, the link capacity map between two mobile vehicles 105 may have only one local maximum value with respect to spatial coordinates. If this is the case, then the standard extremum-seeking algorithm described below will converge stably to the local maximum value in the link capacity map. In complex environments, however, there may be more than one local maximum value in the link capacity map between two mobile vehicles 105. If this is the case, then the results of several iterations of the extremum-seeking algorithm may need to be compared to ensure that a true local maximum value is found. Multiple iterations of the extremum seeking algorithm can be performed by reinitializing the vehicle position randomly or out of the neighborhood previously visited local maxima.

After the extremum-seeking algorithm has been performed, in a step 225, the mobile vehicles 105 are moved to the new positions determined by the extremum-seeking algorithm and the capacity of the wireless data link 135 is measured again. In a step 230, a determination is made as to whether the current capacity of the wireless data link 135 exceeds a selected minimum threshold value. This step ensures that, as the mobile vehicles 105 attempt to optimize the capacity of the wireless data link 135 by repositioning themselves, the communication link between the mobile vehicles 105 is not lost altogether. If the link capacity drops below the minimum threshold value, then in a step 235, the mobile vehicles 105 are returned to the positions corresponding to the best presently-known link capacity, and the process continues to the next wireless data link 135. In performing sequential optimization of different wireless links in a relay chain, one method to monotonically improve overall performance is to optimize the capacity of a wireless data link 135 by oscillating only one of the vehicles 105 at a time.

If the link capacity remains above the minimum threshold value, then in a step 240, a determination is made as to whether the new link capacity measurement exceeds the previously-stored maximum value. If so, then in a step 245, the maximum measured link capacity is replaced with the present value and the corresponding positions of the mobile vehicles 105 are stored in memory.

Then, in a step 250, a determination is made as to whether the link capacity has stabilized, or converged stably on a local maximum value. If so, then in step 235, the mobile vehicles 105 are moved to the positions corresponding to the local maximum value in the link capacity map, and the process continues to the next wireless data link 135. Otherwise, the process returns to step 220, and another iteration of the extremum-seeking algorithm is performed.

Figure 3:
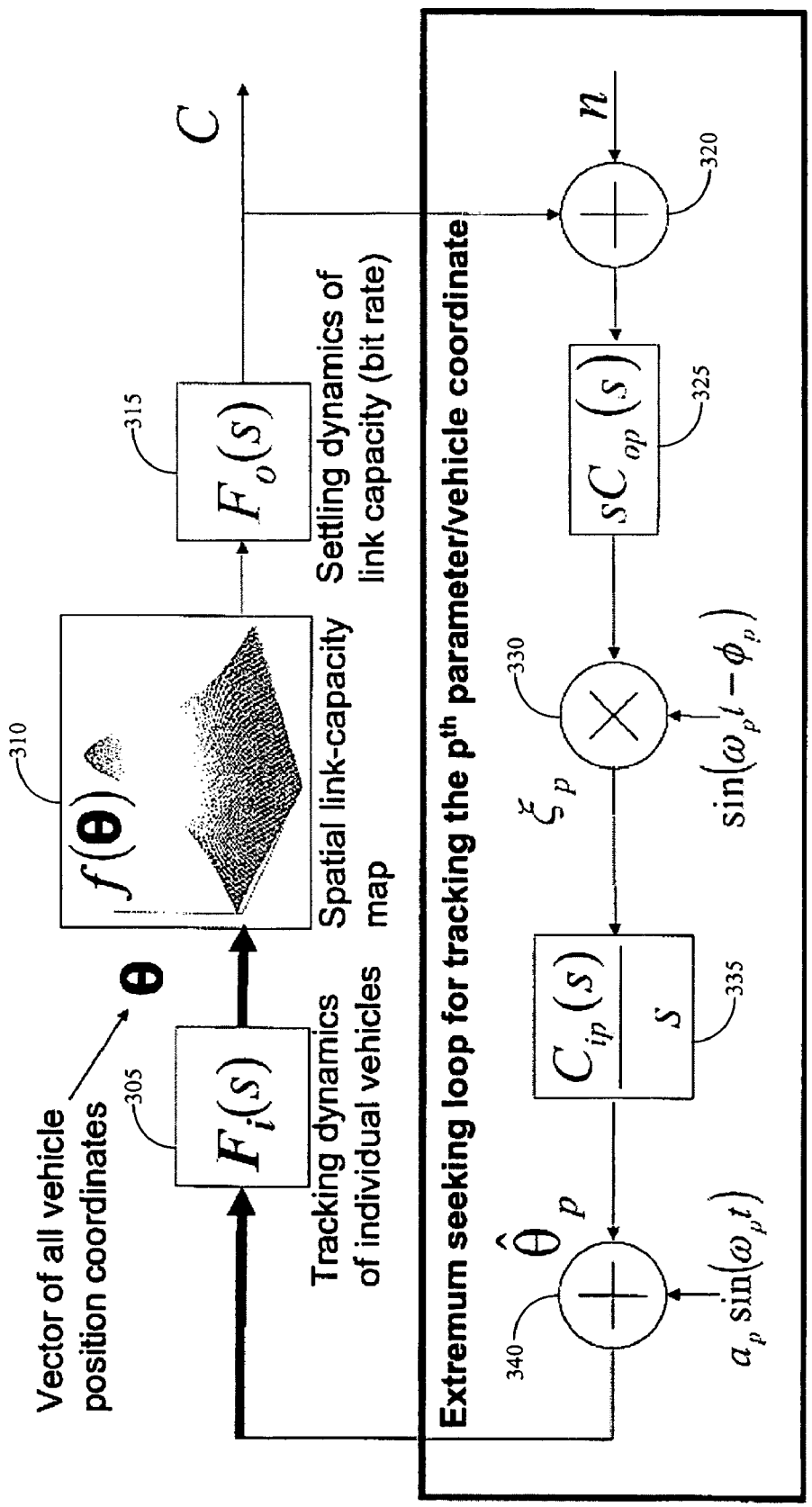
FIG. 3 is a signal flow diagram illustrating one loop of an embodiment of an extremum-seeking algorithm.

FIG. 3 is a signal flow diagram illustrating one loop of an embodiment of an extremum-seeking algorithm. This algorithm is implemented in the optimization modules 125 of the mobile vehicles 105 between which a given wireless data link 135 exists. The algorithm involves oscillating the mobile vehicles 105 locally around their default positions, thereby causing oscillations in the capacity of the wireless data link 135 between the mobile vehicles 105. Because it takes substantially longer for a mobile vehicle 105 to move to a new position (e.g., typically about ½ to 1 second or longer) than it takes for a wireless data link 135 to become settled (e.g., typically less than about a millisecond), the algorithm stably converges on a local maximum value in the capacity of the wireless data link 135.

In the illustrated embodiment, the input dynamics 305, labeled $F_i(s)$, represent the closed-loop position tracking dynamics of the mobile vehicles 105. The spatial link capacity map 310, labeled $f(\theta)$, represents the capacity of the wireless data link 135 at various spatial coordinates of the mobile vehicles 105. The output dynamics 315, labeled $F_o(s)$, represent the settling of the communication system components (e.g., synchronization circuits, etc.) comprising the wireless data link 135 between the mobile vehicles 105.

In operation, the $\alpha_p \sin(\omega_p t)$ term added by adder 340 represents the perturbation in the tracking set point of the mobile vehicle 105 around its present position. This perturbation, in turn, causes oscillation of the link capacity signal. As a result of this oscillation, the gradient of the link capacity signal map can be identified and the mobile vehicle 105 can be moved in the direction of increasing link capacity.

The link capacity signal is noisy, as represented by noise signal, n, added to the link capacity signal by adder 320. This noisy signal is passed through a washout filter 325, labeled $sC_{op}(s)$, where $C_{op}(s)$ represents an output compensator. In some embodiments, for example, $C_{op}(s)=1/(s+h)$, where h is a selected constant. The washout filter 325 eliminates the constant part of the function. The signal is then demodulated with a $\sin(\omega_p t - \phi_p)$ term by multiplier 330, resulting in a number proportional to the slope of the function. The signal is then passed through a filter 335, labeled $[C_{ip}(s)]/s$, where $C_{ip}(s)$ represents an input compensator, which may comprise any of a wide variety of suitably-designed proper transfer functions. In some embodiments, for example, $C_{ip}(s)$ is simply a constant. By multiplying the signal by a $\sin(\omega_p t - \phi_p)$ term and integrating, the optimization module 125 identifies the gradient of the link capacity map and ensures that the mobile vehicle 105 is moving in the direction of increasing link capacity toward a local maximum value.

To optimize the capacity of a given wireless data link 135, the loop of the extremum-seeking algorithm illustrated in FIG. 3 is executed for each position coordinate available for adjustment. As an example, for a wireless data link 135 existing between two mobile vehicles 105 that are free to move in all three dimensions, the extremum-seeking algorithm would optimize the wireless data link 135 over six position coordinates, i.e., once for each position coordinate (x, y, z) for each mobile vehicle 105.

As discussed above, in some applications, the movement of a given mobile vehicle 105 may be restricted due to external design constraints. For example, if a mobile vehicle 105 is being used to conduct video surveillance of activity on a street, the movement of the mobile vehicle 105 is restricted such that the optical sensor(s) of the mobile vehicle 105 always have an unobstructed view of the street. In this example, the mobile vehicle 105 may be free to move in only one dimension (e.g., along the edge of a particular rooftop or balcony), and the extremum-seeking algorithm would optimize a wireless data link 135 over only one dimension for this mobile vehicle 105.

One element of extremum seeking design in the context of the systems and methods described above is knowledge of the range of values and median range of local interference map second derivatives. This is obtainable from simulation and experiment for both electromagnetic and acoustic channels. This enables extremum seeking designs that are guaranteed to converge stably to local maxima most of the time. In practice, it is virtually impossible to obtain stable convergence all of the time because the interference map second derivatives can fall outside of the median range for which extremum seeking can reasonably be designed. This is the reason for development of the resetting mechanism described above in connection with FIG. 2.

A more detailed description of extremum-seeking algorithms in general (including systematic design procedures with convergence guarantees) is available in the following publications: *Real-Time Optimization by Extremum-Seeking Control*, by Kartik B. Ariyur and Miroslav Krstic, Wiley, 2003; *Multivariable Extremum Seeking Feedback: Analysis and Design*, by Kartik B. Ariyur and Miroslav Krstic, Fifteenth International Symposium on Mathematical Theory of Networks and Systems, University of Notre Dame, Aug. 12-12, 2002. These publications, in their entireties, are incorporated herein by this reference.

The systems and methods described above provide a number of distinct advantages over conventional mobile vehicle systems. For example, the extremum-seeking algorithm enables optimization of a wireless data link between mobile vehicles operating in a complex environment having irregular terrain. Because the algorithm is designed to stably converge on a local maximum value in the spatial link capacity map, the optimization of the wireless data link is advantageously based on reliable mathematical guarantees, rather than imprecise trial-and-error methods. In addition, the optimization techniques described above can be customized based on the design constraints imposed by the desired functions to be performed by the mobile vehicles.

Although this invention has been described in terms of certain preferred embodiments, other embodiments that are apparent to those of ordinary skill in the art, including embodiments that do not provide all of the features and advantages set forth herein, are also within the scope of this invention. Accordingly, the scope of the present invention is defined only by reference to the appended claims and equivalents thereof.

What is claimed is:

1. A method for optimizing a wireless data link between a first mobile vehicle and a second mobile vehicle, the method comprising:
   (a) positioning the first mobile vehicle in a first location and the second mobile vehicle in a second location;
   (b) creating a direct wireless data link between the first mobile vehicle and the second mobile vehicle;
   (c) measuring an initial capacity of the wireless data link and storing it as a maximum measured capacity;
   (d) performing an extremum-seeking algorithm on the capacity of the wireless data link;
   (e) moving the first mobile vehicle and the second mobile vehicle to new positions determined by the extremum-seeking algorithm and measuring a new data link capacity;
   (f) determining whether the new data link capacity exceeds a minimum threshold value and, if not, skipping to step (i);
   (g) determining whether the new data link capacity exceeds the previously-stored maximum measured capacity and, if so, replacing the maximum measured capacity with the new data link capacity value and storing the corresponding positions of the mobile vehicles;
   (h) repeating steps (d)-(g) until the data link capacity stabilizes; and
   (i) moving the first mobile vehicle and the second mobile vehicle to positions corresponding to the maximum measured capacity.

2. The method of claim 1, wherein the first mobile vehicle and the second mobile vehicle are selected from the group consisting of hover-capable unmanned aerial vehicles, fixed-wing unmanned aerial vehicles, organic air vehicles, mobile ground vehicles, and unmanned underwater vehicles.

3. The method of claim 1, wherein the first mobile vehicle and the second mobile vehicle act as communication relays.

4. The method of claim 1, wherein the first mobile vehicle and the second mobile vehicle monitor and collect data regarding their surrounding environment.

5. The method of claim 1, wherein the first mobile vehicle or the second mobile vehicle communicates with a base station.

6. The method of claim 5, wherein the base station comprises a port able handheld device or a fixed data gathering station.

7. The method of claim 1, wherein the extremum-seeking algorithm comprises perturbing position-tracking set points of the first and second mobile vehicles around their present positions.

8. The method of claim 1, wherein the extremum-seeking algorithm comprises identifying a gradient in a link capacity signal map and moving the first and second mobile vehicles in the direction of increasing link capacity.

9. The method of claim 8, wherein a local maximum in the link capacity signal map is identified by comparing the results of multiple iterations of the extremum-seeking algorithm.

10. The method of claim 1, wherein the extremum-seeking algorithm is capable of optimizing the wireless data link capacity over three position coordinates for each mobile vehicle.

11. The method of claim 1, wherein the extremum-seeking algorithm optimizes the wireless data link capacity over one or two position coordinates for a given mobile vehicle due to external design constraints.

12. A method for optimizing a wireless data link involving a first mobile vehicle, the method comprising:
   (a) positioning the first mobile vehicle in a first location, the first mobile vehicle comprising a hover-capable unmanned aerial vehicle, a fixed-wing unmanned aerial vehicle, an organic air vehicle, or an unmanned underwater vehicle;
   (b) creating a wireless data link between the first mobile vehicle and a telecommunications device;
   (c) measuring an initial capacity of the wireless data link and storing it as a maximum measured capacity;
   (d) performing an extremum-seeking algorithm on the capacity of the wireless data link;
   (e) moving the first mobile vehicle to a new position determined by the extremum-seeking algorithm and measuring a new data link capacity;
   (f) determining whether the new data link capacity exceeds a minimum threshold value and, if not, skipping to step (i);
   (g) determining whether the new data link capacity exceeds the previously-stored maximum measured capacity and, if so, replacing the maximum measured capacity with the new data link capacity value and storing the corresponding position of the first mobile vehicle;
   (h) repeating steps (d)-(g) until the data link capacity stabilizes; and
   (i) moving the first mobile vehicle to a position corresponding to the maximum measured capacity.

13. The method of claim 12, wherein the telecommunications device comprises a second mobile vehicle.

14. The method of claim 13, wherein while the first mobile vehicle is moving to the new position, the second mobile vehicle is simultaneously moving around its current location.

15. The method of claim 12, wherein the telecommunications device comprises a base station.

16. The method of claim 15, wherein the base station comprises a portable handheld device or a fixed data gathering station.

17. The method of claim 12, wherein the first mobile vehicle acts as a communication relay.

18. The method of claim 12, wherein the first mobile vehicle monitors and collects data regarding its surrounding environment.

19. The method of claim 12, wherein the extremum-seeking algorithm comprises perturbing a tracking set point of the first mobile vehicle around its present position.

20. The method of claim 12, wherein the extremum-seeking algorithm comprises identifying a gradient in a link capacity signal map and moving the first mobile vehicle in the direction of increasing link capacity.

21. The method of claim 20, wherein a local maximum in the link capacity signal map is identified by comparing the results of multiple iterations of the extremum-seeking algorithm.

22. The method of claim 12, wherein the extremum-seeking algorithm is capable of optimizing the wireless data link capacity over three position coordinates for the first mobile vehicle.

23. The method of claim 22, wherein the extremum-seeking algorithm optimizes the wireless data link capacity over one or two position coordinates for the first mobile vehicle due to external design constraints.

24. A process for optimizing a wireless data link between a first mobile vehicle and a second mobile vehicle, the process comprising:
- (a) placing the first and second mobile vehicles in default positions, the first and second mobile vehicles each comprising a hover-capable unmanned aerial vehicle, a fixed-wing unmanned aerial vehicle, an organic air vehicle, or an unmanned underwater vehicle;
- (b) creating a direct wireless data link between the first and second mobile vehicles;
- (c) measuring an initial capacity of the wireless data link and storing it as a maximum measured capacity;
- (d) performing an extremum-seeking algorithm on the capacity of the wireless data link;
- (e) moving the first and second mobile vehicles to new positions determined by the extremum-seeking algorithm and measuring a new data link capacity;
- (f) determining whether the new data link capacity exceeds a minimum threshold value and, if not, skipping to step (i);
- (g) determining whether the new data link capacity exceeds the previously-stored maximum measured capacity and, if so, replacing the maximum measured capacity with the new data link capacity value and storing the corresponding positions of the mobile vehicles;
- (h) repeating steps (d)-(g) until the data link capacity stabilizes; and
- (i) moving the first and second mobile vehicles to positions corresponding to the maximum measured capacity.

25. The process of claim 24, wherein the first mobile vehicle and the second mobile vehicle act as communication relays.

26. The process of claim 24, wherein the first mobile vehicle and the second mobile vehicle monitor and collect data regarding their surrounding environment.

27. The process of claim 24, wherein the first mobile vehicle or the second mobile vehicle communicates with a base station.

28. The process of claim 27, wherein the base station comprises a portable handheld device or a fixed data gathering station.

29. The process of claim 24, wherein the extremum-seeking algorithm comprises perturbing tracking set points of the first and second mobile vehicles around their present positions.

30. The process of claim 24, wherein the extremum-seeking algorithm comprises identifying a gradient in a link capacity signal map and moving the first and second mobile vehicles in the direction of increasing link capacity.

31. The process of claim 24, wherein the extremum-seeking algorithm is capable of optimizing the wireless data link capacity over three position coordinates for each mobile vehicle.

32. The process of claim 31, wherein the extremum-seeking algorithm optimizes the wireless data link capacity over one or two position coordinates for a given mobile vehicle due to external design constraints.

33. A mobile vehicle comprising:
- an unmanned vehicle comprising a hover-capable unmanned aerial vehicle, a fixed-wing unmanned aerial vehicle, an organic air vehicle, or an unmanned underwater vehicle;
- a processor comprising an optimization module;
- a sensor coupled to the processor; and
- a transceiver coupled to the processor;
- wherein the transceiver is capable of sending and receiving wireless data transmissions;
- wherein the optimization module is configured to:
  - (a) measure an initial capacity of a wireless data link between the transceiver and another telecommunications device, and store the initial capacity as a maximum measured capacity;
  - (b) perform an extremum-seeking algorithm on the capacity of the wireless data link;
  - (c) move the mobile vehicle to a new position determined by the extremum-seeking algorithm and measure a new data link capacity;
  - (d) determine whether the new data link capacity exceeds a minimum threshold value and, if not, skip to (g);
  - (e) determine whether the new data link capacity exceeds the previously-stored maximum measured capacity and, if so, replace the maximum measured capacity with the new data link capacity value and store the corresponding position of the mobile vehicle;
  - (f) repeat (b)-(e) until the data link capacity stabilizes; and
  - (g) move the mobile vehicle to a position corresponding to the maximum measured capacity.

34. The mobile vehicle of claim 33, wherein the sensor comprises one or more audio sensors, temperature sensors, acoustic sensors, or electromagnetic imaging sensors.

35. The mobile vehicle of claim 34, wherein the electromagnetic imaging sensors are selected from the group consisting of optical sensors, through-wall imagers, and foliage-penetration radar.

36. The mobile vehicle of claim 33, wherein the optimization module comprises a washout filter, a demodulator, and an integrator.

37. The mobile vehicle of claim 33, wherein the extremum-seeking algorithm comprises perturbing tracking set points of the mobile vehicle around a present position.

38. The mobile vehicle of claim 33, wherein the extremum-seeking algorithm comprises identifying a gradient in a link capacity signal map and moving the mobile vehicle in the direction of increasing link capacity.

39. The mobile vehicle of claim 33, wherein the extremum-seeking algorithm is capable of optimizing the wireless data link capacity over three position coordinates for the mobile vehicle.

40. The mobile vehicle of claim 39, wherein the extremum-seeking algorithm optimizes the wireless data link capacity over one or two position coordinates for the mobile vehicle due to external design constraints.

41. The mobile vehicle of claim 38, wherein a local maximum in the link capacity signal map is identified by comparing the results of multiple iterations of the extremum-seeking algorithm.

* * * * *